United States Patent Office 3,437,514
Patented Apr. 8, 1969

3,437,514
RADIATION CROSSLINKING OF ALPHA-BETA UNSATURATED PAINT BINDER RESIN
William J. Burlant, Detroit, Mich., assignor to Ford Motor Company, Dearborn, Mich., a corporation of Delaware
No Drawing. Continuation-in-part of application Ser. No. 96,653, Mar. 20, 1961. This application Aug. 2, 1967, Ser. No. 657,795
Int. Cl. C09d 3/76; B44d 1/09; B01j 1/10
U.S. Cl. 117—93.31    8 Claims

ABSTRACT OF THE DISCLOSURE

A process for providing an exposed external surface of an article of manufacture with a wear and weather resistant coating of paint. The film-forming binder of this paint consists essentially of an alpha-beta, olefinically unsaturated organic resin and a monomeric vinyl compound. The resin is characterized by having about 0.5 to about 3.0 alpha-beta olefinic unsaturation units per 1,000 units molecular weight. The monomeric compound is of lower viscosity than the resin and serves both as a solvent and as a reactant. Thus, the monomer facilitates flow of the binder during application of the film and copolymerizes with the resin when the film is cured. Copolymerization is effected with ionizing radiation at a temperature below the temperature at which significant vaporization of the monomer is initiated to provide when applied to a smooth surface an even film characterized in that distortion of specular reflections therefrom is minimized.

---

This application is an continuation-in-part application of my copending application Ser. No. 496,187, filed Oct. 14, 1965, now abandoned. Application Ser No. 496,-187 was a continuation-in-part application of my abandoned applications Ser. Nos. 277,076 and 277,077, both filed May 1, 1963, with which it was copending. Applications Ser. Nos. 277,076 and 277,077 were continuation-in-part applications of my abandoned application Ser. No. 96,653 filed, Mar. 20, 1961, and now abandoned.

It it recognized that the copolymerization of vinyl monomers with resins of varying degrees of unsaturation is known in the arts of chemical production, the production of laminates, cloth and wood impregnation, certain limited coating operations, etc. The following U.S. patents are illustrative of such disclosures: 2,60,483, 2,763,609, 2,766,220, 2,863,812, 2,897,092, 2,900,277, 2,904,481, 2,907,675, 2,914,450, 2,921,006, 2,926,126, 2,929,744, 2,940,869, 2,955,953, 2,956,904, 2,957,814, 2,964,456, 2,965,553, 2,991,269, 2,998,329, 2,999,056, 3,008,920, 3,047,531, 3,062,774, 3,075,904, 3,077,417, 3,077,418, 3,077,419, 3,077,420, 3,079,312, 3,081,485, 3,087,875, 3,088,791, 3,090,698, 3,092,512, 3,097,960, 3,107,206, 3,111,424, 3,115,418, 3,121,672, 3,131,138, 3,131,139, 3,133,825, 3,133,828, 3,137,674, 3,154,479, 3,157,560, 3,170,892, 3,188,165 3,188,228 and 3,252,880.

This invention is concerned with the specific art of providing external surface finishes to articles of manufacture which are wear and weather resistant by painting such surfaces with a paint hereinafter defined and curing the paint with polymerization effecting electrons so as to provide a rapid cure without the use of catalysts or the heat of conventional curing ovens. Thus, the coatings to which this process is directed may be classified as finish coatings and as such are required to provide an appearance and physical properties characteristic of a finish paint. Many articles of manufacture are acceptable in the marketplace only when provided with a smooth, glossy, uniform finish. Typical of these are the exteriors of automobiles, structural and/or decorative wood and metal panels, etc. Such surfaces to varying degrees reflect sunlight or other bright light in a manner such as to point up and magnify the actual surface irregularities. Other articles may require a nonglossy or flat appearance that is equally regular and relatively smooth. Still other substrates are purposely irregular in surface and such irregularity is maintained and emphasized by the finish paint.

When one paints with an unsaturated resin-unsaturated monomer binder and utilizes ionizing radiation to effect copolymerization and thus cure the paint film, it has been found that the type and degree of unsaturation in the resin is of critical importance in providing quality paint. Thus, in the method of this invention, the resin is provided with alpha-beta olefinic unsaturation and such unsaturation is limited to about 0.5 to about 3 units per 1,000 units molecular weight. The term "alpha-beta olefinically unsaturated resin" is used herein to mean an organic resin having olefinic unsaturation provided by an alpha-beta olefinically unsaturated constituent monomer. These resins advisedly have a molecular weight above about 1,000. The upper limits of molecular weight will vary with the type of resin employed as hereinafter more fully described and illustrated. The molecular weight of the resin and the amount of monomers used will, of course, be compatible with the desired viscosity for the binder keeping in mind the desired mode of application. In the coating of three-dimensional articles, the binder solution should have a viscosity low enough to permit rapid application thereof to the substrate in substantially even depth and high enough so that a 1 mil (.001 inch) film will hold on a vertical surface without sagging.

In this application, the term "paint" is meant to include finely divided pigment and/or particulate filler in a film-forming, resin comprising, binder, and the binder without pigment and/or particulate filler. Thus, the binder which is ultimately converted to a weather and wear resistant film can be all or virtually all that is used to form the film, or it can be a vehicle for pigmentary and/or particulate filler material.

These films are applied to the substrate in this method by conventional application means, e.g., brushing, spraying, roller coating, etc., to an average thickness of above about 0.1, preferably about 0.5 to about 4 mils, and are then subjected to ionizing radiation. The term "ionizing radiation" as employed herein means radiation having a minimum energy of, or equivalent to, about 5,000 electron volts. It is preferred to effect the cure with an electron beam. The average energy of the polymerization effecting electrons is preferably about 150,000 to about 450,000 volts. The films are preferably cured in an inert atmosphere at a relatively low temperature, i.e., between room temperature (20° to 25° C.) and the temperature at which significant vaporization of its most volatile component is initiated.

The term "acrylic monomer" as used herein means an alpha-beta monounsaturated monocarboxylic acid or esters thereof and includes, but not by way of limitation, acrylic acid, alkacrylic acids, e.g., methacrylic acid, monohydric and polyhydric alcohol esters of acrylic acid and alkacrylic acids, e.g., glycidyl methacrylate, 2-hydroxyethyl methacrylate, etc.

The paint binder solutions contain about 15 to about 60, advantageously 25 to 50 weight percent, vinyl monomers. The vinyl monomer component may consist of a single compound or may be a mixture of more than one monomeric compound. In one preferred embodiment, dissimilar monomers are employed in admixture, e.g., a vinyl hydrocarbon monomer and an acrylic monomer.

In the first embodiment, the alpha-beta olefinically unsaturated resin of the binder is a polyester resin having a molecular weight in excess of about 1,000, preferably in the range of about 2,000 to about 20,000. The preferred polyester resins for this binder are prepared by copolymerizing a polyhydric alcohol, an acyclic alpha-unsaturated alpha-beta dicarboxylic acid, and a cyclic aliphatic dicarboxylic acid. It will be understood that when the terms "acid" and "carboxylic acid" are employed herein, such terms include both the acid, as such, and the anhydride thereof where the latter exists. The acyclic acid is exemplified by maleic anhydride while the cyclic acid is exemplified by tetrahydrophthalic anhydride. In the preferred polyester resins, the cyclic, dicarboxylic acid makes up a major amount of the acid component, and the polyhydric alcohol is an acyclic glycol.

In a second embodiment, the resin of the binder is a vinyl resin. The term "vinyl resin" as herein employed includes acrylic resins and modified-acrylic resins. The former as used herein means a resin formed exclusivley of acrylic monomers while the latter as used herein means a resin formed from a major amount of acrylic monomers and a minor amount of nonacrylic monomers. These resins have a molecular weight in excess of about 1,000, commonly about 5,000 to about 50,000 or higher, and preferably about 5,000 to about 25,000.

In another embodiment, the resin of the binder is a silicone-modified organic resin. The silicone-modified resin may be a polyester resin having incorporated therein a cyclic or an acyclic siloxane which prior to the reaction of incorporation has a reactive hydroxyl or hydrocarbonoxy group bonded to at least two of its silicon atoms. These resins have a molecular weight of at least about 1,000, preferably about 2,000 to about 20,000. The silicone-modified resin may also be prepared by reacting a siloxane with a hydroxylated vinyl resin prepared by reacting vinyl monomers, at least one of which is a hydroxylated monomer such as 2-hydroxyethyl methacrylate. A portion of the hydroxyl or hydrocarbonoxy groups of the siloxane are reacted with the hydroxyl groups of the resin and the remainder are subsequently reacted with a hydroxylated unsaturated compound. These resins have a molecular weight of at least about 1,000, commonly about 5,000 to about 50,000 or higher, and preferably about 5,000 to about 25,000.

In another embodiment, the resin of the binder is a urethane-modified organic polymer formed by reacting a diisocyanate monomer and an organic resin having in its molecular structure a plurality of hydrogen atoms which are labile with respect to an isocyanate group, e.g., a labile hydrogen atom of an amine, amide, alcohol or carboxylic acid, and subsequently reacting the product with a hydroxylated vinyl monomer. The organic resin used in this preparation may be a polyester or a resin formed by copolymerization of acrylic monomers.

In another embodiment, the resin of the binder is an epoxy resin having the requisite amount of alpha-beta olefinic unsaturation.

All of the aforementioned binder resins have about 0.5 to about 3, preferably about 1 to about 2, alpha-beta olefinic unsaturation units per 1,000 units molecular weight.

The term "rad" as employed herein means that dose of radiation which results in the absorption of 100 ergs of energy per gram of absorber.

This invention will be more fully understood by referring to the following illustrative examples.

EXAMPLE 1

A paint binder is prepared from the materials below listed in the manner hereinafter set forth:

To a reaction vessel are charged 14.7 lbs. maleic anhydride, 72.3 lbs. tetrahydrophthalic anhydride, 75.0 lbs. neopentyl glycol and 113.0 grams dibutyl tin oxide. The charge is heated to 340° F. and held at this temperature for 1 hour. The temperature of the charge is then raised to a temperature of 440° F. and maintained at such temperature until the acid number of the resulting resin is below about 20. The excess glycol and water are removed by vacuum and when the acid number is below about 10, there are added 14.5 grams hydroquinone. The charge is allowed to cool to about 180° F. and there is added 37.0 lbs. styrene. A binder solution is prepared using 50 parts by weight of this material and 50 parts by weight of styrene.

The resulting film-forming material is sprayed upon wood and metal 4″ x 12″ panels. Films of 1, 1.5 and 2 mils average depth are applied and the paint is then cured by directing an electron beam having a potential of about 260,000 electron volts to the coated surface, the window of the electron-emitting means being spaced apart from the coated surface a distance of about 3 inches. The coating is contacted by the electron beam until a total dose of about 10 megarad is transmitted to the coating.

EXAMPLE 2

The procedure of Example 1 is repeated except that the resin is employed with an equal amount of divinyl benzene and the coated panel is irradiated under a helium blanket.

EXAMPLE 3

The procedure of Example 1 is repeated except that ½ of the styrene added to form the binder solution is replaced with methyl methacrylate.

EXAMPLE 4

The procedure of Example 1 is repeated using a beam potential of about 150,000 volts and with the coated panel blanketed with helium.

EXAMPLE 5

The procedure of Example 1 is repeated except that fumaric acid is employed in lieu of the maleic anhydride and the film is irradiated with ionizing energy in a helium atmosphere until cured to a tack-free coating.

EXAMPLE 6

The procedure of Example 1 is repeated except that 1,2-cyclohexane dicarboxylic anhydride is employed in lieu of tetrahydrophthalic anhydride (4-cyclohexene-1,2-dicarboxylic anhydride) and the film is irradiated with ionizing energy in a helium atmosphere until cured to a tack-free coating.

EXAMPLE 7

The procedure of Example 1 is repeated except that phthalic anhydride is employed in lieu of tetrahydrophthalic anhydride and the film is irradiated with ionizing energy in a helium atmosphere until cured to a tack-free coating.

EXAXMPLE 8

The procedure of Example 1 is repeated except that propylene glycol is employed in lieu of neopentyl glycol and the film is cured in a helium atmosphere by ionizing radiation until a tack-free coating is formed.

EXAMPLE 9

The procedure of Example 1 is repeated first in air and second in a helium atmosphere at potentials of 150,000 electron volts, 200,000 electron volts, and 290,000 electron volts. This procedure is repeated with the electron emitter spaced apart from the coated workpiece at intervals of 1, 3, 5, 7 and 12 inches.

EXAMPLE 10

An acrylic paint binder resin is prepared from the following monomers:

|  | Mols | Grams |
|---|---|---|
| (a) Methyl methacrylate | 2.6 | 260.0 |
| (b) Ethyl acrylate | 5.0 | 500.0 |
| (c) Glycidyl methacrylate | 1.7 | 240.0 |
| (d) Methacrylic acid | 1.7 | 146.5 |
| (e) Xylene (1,000 ml.) |  |  |
| (f) Benzoyl peroxide |  | 10.0 |
| (g) Hydroquinone |  | 0.2 |

The xylene is heated to 130° C. under a nitrogen blanket and stirred continuously. The monomers (a), (b) and (c), the reaction initiator (f) and the hydroquinone (g) are added to the xylene. The monomers (a), (b) and (c) are added separately and incrementally over a period of 3 hours. The charge is heated at 130°–133° C. for 3 hours. The charge is cooled to about 50° C.

The methacrylic acid (d) is added to the charge and the temperature is raised to 138° C. gradually over a period of about 1.5 hours. This temperature is maintained for about 1 hour and the xylene is removed.

A paint binder is prepared by admixing the acrylic polymer thus formed (45.6%), styrene (17.2%) and methyl methacrylate (37.2%). A film of this binder is sprayed upon wood and metal panels and irradiated by an electron beam under the following conditions:

Potential _____ 295 kv.
Current _____ 1 milliampere.
Atmosphere _____ Helium.
Line speed _____ 6.5, 3.2 and 1.6 cm./sec.
Distance, emitter to workpiece _____ 10 inches.
Passes _____ 2.
Dose _____ 2,5, 5 and 10 mrad.

For doses of 2.5, 5 and 10 mrad, the Sward Hardness is 14, 30 and 30 respectively.

A mill base is prepared from the following ingredients:

Grams
TiO$_2$ _____ 70
Acrylic resin, above prepared _____ 86.1
Methyl methacrylate _____ 10.6

This mix is ground 24 hours in a ball mill to a fineness of about 8 Heg.

A paint is prepared by admixing the above mill base with styrene and additional methyl methacrylate, the paint having the following composition:

Grams
TiO$_2$ _____ 70
Acrylic resin _____ 86.1
Methyl methacrylate _____ 48.1
Styrene _____ 11.7

This paint is sprayed upon wood and metal panels to form a 1.5 mil coating and irradiated as before using a line speed of 6.5 cm./sec., 2 passes, for a total dose of about 2.5 mrad. The cured coating has a Sward Hardness of about 36.

EXAMPLE 11

A modified-acrylic resin is prepared as in the preceding example except that 0.6 mol of methyl methacrylate is replaced with 0.6 mol of styrene. A paint binder and a pigmented paint are prepared, sprayed and cured by irradiation as in the preceding example.

EXAMPLE 12

The procedure of Example 10 is repeated with the potential of the electron beam adjusted to about 175,000 electron volts. The exposure is controlled to provide a total dose equivalent to that of Example 10.

EXAMPLE 13

The procedure of Example 10 is repeated with the potential of the electron beam adjusted to about 400,000 electron volts. The exposure is controlled to provide a total dose equivalent to that of Example 1.

EXAMPLE 14

The procedure of Example 10 is repeated using the acrylic resin of Example 10 in varying amounts of vinyl monomers. The concentrations employed are as follows:

| Resin, percent | Styrene, percent | Methyl methacrylate, percent |
|---|---|---|
| 60 | 20 | 20 |
| 50 | 20 | 30 |
| 50 | 30 | 20 |
| 40 | 30 | 30 |

EXAMPLE 15

A silicone-modified polyester, paint binder resin is prepared in the following manner:

To a reaction vessel are charged 70 lbs. of neopentyl glycol, 10 lbs. of xylene, and 35 lbs. of a commercially available (Dow Corning Z–6018) hydroxy-functional, cyclic, polysiloxane having the following properties:

Hydroxy content, Dean-Stark:
   Condensible, percent _____ 5.5
   Free, percent _____ 0.5
Average molecular weight _____ 1600
Combining weight _____ 400
Refractive index _____ 1.531–1.539
Softening point, Durran's Mercury Method, degrees F. _____ 200
At 60% solids in xylene:
   Specific gravity at 77° F. _____ 1.075
   Viscosity:
     At 77° F., centipoises _____ 33
     Gardner-Holdt _____ A–1

The charge is heated to about 345° F. (174° C.) for 2.5 hours, after which there is added 13.7 lbs. maleic anhydride, 54.2 lbs. of tetrahydrophthalic anhydride and 100 grams of dibutyl tin oxide. The temperature of the charge is raised slowly to about 430° F. (221° C.) and this temperature is maintained until the resulting resin has an acid number of about 10. Some of xylene and water of reaction are removed during the cook and the excess is then removed by vacuum. To the charge is added 12.5 grams hydroquinone and the charge is cooled to 180° F. (82.5° C.) and diluted with 40 lbs. of styrene.

A white mill base is then prepared by mixing 3050 lbs. of TiO$_2$, 1805 lbs. of resin, prepared as in the preceding paragraph, 146 lbs. of styrene, 507 lbs. of methyl methacrylate, and 20 lbs. of Bakers M.P.A., a wax-like, high molecular weight, castor oil derivative to facilitate the grinding through viscosity adjustment and assist in retention of pigment dispersion in the grind, and passing the foregoing mixture through a conventional sand grinder.

This mill base is further diluted with styrene and methyl methacrylate in amounts such as to provide a paint comprising about 40% resin, 30% styrene and 30% methyl methacrylate. A film of the resulting paint is sprayed upon wood and metal panels and irradiated by an electron beam under the following conditions:

Potential _____kv__ 295
Current _____milliampere__ 1
Distance, emitter to workpiece _____inches__ 10
Line speed _____cm./sec.__ 1.6
Passes _____ 2
Total dosage _____mrad__ 10

EXAMPLE 16

A silicone-modified polyester, paint binder resin is prepared in the following manner:

To a reaction vessel are charged 1330 lbs. of neopentyl glycol and 1080 lbs. of a commercially available methoxylated partial hydrolysate of monophenyl and phenylmethyl silanes consisting essentially of dimethyltriphenyltrimethoxytrisiloxane (Dow Corning—Sylkyd 50) and have the following typical properties:

| | |
|---|---|
| Average molecular weight | 470 |
| Combining weight | 155 |
| Specific gravity at 77° F. | 1.105 |
| Viscosity at 77° F., centistokes | 13 |

The charge is heated to about 345° F. (174° C.) until about 215 lbs. methanol are removed overhead. The charge is cooled to about 250° F. (121° C.) after which there is added 196 lbs. maleic anhydride, 964 lbs. tetrahydrophthalic anhydride, 2.2 lbs. dibutyl tin oxide and 150 lbs. xylene. The temperature of the charge is raised slowly to about 420° F. (215° C.) and this temperature is maintained until the resulting resin has an acid number of 10. A vacuum is pulled to remove the xylene and 61 lbs. hydroquinone are charged and the charge is cooled to 200° F. and dumped into a mixing tank with 780 lbs. styrene.

A white mill base is then prepared by mixing 3050 lbs. of TiO$_2$, 1805 lbs. of resin, prepared as in the preceding paragraph, 146 lbs. of styrene, 507 lbs. of methyl methacrylate, and 20 lbs. of Bakers M.P.A., a wax-like, high molecular weight, castor oil derivative to facilitate the grinding through viscosity adjustment and assist in retention of pigment dispersion in the grind, and passing the foregoing mixture through a conventional sand grinder.

This mill base is further diluted with styrene and methyl methacrylate in amounts such as to provide a paint comprising about 40% resin, 30% styrene and 30% methyl methacrylate. A film of the resulting paint is sprayed upon wood and metal panels and irradiated by an electron beam under the following conditions:

| | | |
|---|---|---|
| Potential | kv | 295 |
| Current | milliampere | 1 |
| Distance, emitter to workpiece | inches | 10 |
| Line speed | cm./sec | 1.6 |
| Passes | | 2 |
| Total dosage | mrad | 10 |

EXAMPLE 17

A polyester resin, hereinafter designated Resin A, is prepared from the following monomers:

| | Mols | Grams |
|---|---|---|
| Succinic acid | 2.88 | 340.1 |
| Tetrahydrophthalic anhydride | 9.12 | 1,387.6 |
| 1,2-propanediol | 13.20 | 1,004.4 |

The monomers with 200 cc. xylene are subjected to a solvent cook over a period of 10 hours gradually raising the temperature to 260° C. The resultant resin has an acid number of about 5.7. The xylene is separated from the resin and a solution of the resin in styrene is prepared to which is sequentially added tolylene diisocyanate and 2-hydroxyethyl methacrylate. The composition of this reaction mixture is as follows:

| | Mols | Grams |
|---|---|---|
| Resin A | 1.94 | 200 |
| Tolylene diisocyanate app. 80% 2,4-, 20% 2,6- | 0.1 | 17.4 |
| Styrene | 0.82 | 86 |
| 2-hydroxyethyl methacrylate | 0.1 | 13 |

The addition of the diisocyanate is made slowly and incrementally and the charge is continuously stirred over a period of 5.5 hours to form Resin B. The methacrylate is then added slowly and incrementally and the charge is continuously stirred over a period of 25 hours to form Resin C.

The monomer content is adjusted to provide a paint binder spray containing 60% Resin C and 40% styrene. The binder is sprayed upon wood panels and irradiated. The coating is irradiated with an electron beam. The conditions of irradiation are as follows:

| | | |
|---|---|---|
| Potential | kv | 260 |
| Current | milliampere | 1 |
| Dose rate | mrad/pass | 5 |
| Passes | | 2 |
| Line speed | cm./sec | 1.6 |
| Distance, emitter to workpiece | inches | 10 |
| Total dose | mrad | 10.0 |

It will be understood by those skilled in the art that modifications can be made within the foregoing examples within the scope of this invention as hereinbefore described and hereinafter claimed.

I claim:

1. A method of providing an external surface of a substrate with an adherent, polymerized coating of paint which comprises applying to said substrate a liquid coating of a film-forming solution of vinyl monomers and an alpha-beta olefinically unsaturated organic paint binder resin wherein the units of alpha-beta olefinic unsaturation are limited to the range of about 0.5 to about 3 per 1,000 units resin molecular weight and crosslinking said binder resin and said vinyl monomers by irradiating said liquid coating upon said substrate with an electron beam having an average energy in the range of about 150,000 to about 450,000 electron volts.

2. A method in accordance with claim 1 wherein said vinyl monomers are acrylic monomers.

3. A method in accordance with claim 1 wherein at least about 40 percent of said vinyl monomers are methyl methacrylate monomers.

4. A method in accordance with claim 1 wherein said vinyl monomers are vinyl hydrocarbon monomers.

5. A method in accordance with claim 1 wherein at least about 40 percent of said vinyl monomers are styrene.

6. A method in accordance with claim 1 wherein the concentration of alpha-beta olefinic unsaturation units in said resin is in the range of about 1 to about 2 per 1,000 units molecular weight.

7. A method in accordance with claim 1 wherein said resin is a polyester and has a molecular weight in the range of about 2,000 to about 20,000.

8. A method in accordance with claim 1 wherein said resin is a vinyl monomer-comprising polymer and has a molecular weight in the range of about 5,000 to about 25,000.

References Cited

UNITED STATES PATENTS

| | | | |
|---|---|---|---|
| 2,900,277 | 8/1959 | Schmitz et al. | 117—93.31 X |
| 3,157,560 | 11/1964 | Livingston et al. | 117—93.31 X |
| 3,275,710 | 9/1966 | Wooster et al. | 260—861 X |
| 3,275,711 | 9/1966 | Wooster | 260—861 X |

OTHER REFERENCES

Bjorksten et al.: Polyesters and Their Application, Rheinhold Publishing Corp., New York, 1956, pp. 157 and 158.

ALFRED L. LEAVITT, *Primary Examiner.*

J. H. NEWSOME, *Assistant Examiner.*

U.S. Cl. X.R.

117—161; 204—159.19; 260—872